July 20, 1943.  W. G. FINLAYSON ET AL  2,324,688
POWER TRANSMISSION
Filed March 8, 1941

INVENTORS
WILLIAM G. FINLAYSON
L. RAYMOND TWYMAN &
RALPH L. TWEEDALE
BY
*Ralph L. Tweedale*
ATTORNEY Patented July 20, 1943

2,324,688

UNITED STATES PATENT OFFICE 2,324,688

POWER TRANSMISSION

William G. Finlayson, Detroit, L. Raymond Twyman, Bloomfield Township, Oakland County, and Ralph L. Tweedale, Detroit, Mich., assignors to Vickers Incorporated, Detroit, Mich., a corporation of Michigan Application March 8, 1941, Serial No. 382,290

1 Claim. (Cl. 285—192)

This invention relates to power transmissions, particularly to those of the type comprising two or more fluid pressure energy translating devices, one of which may function as a pump and another as a fluid motor.

The invention is more particularly concerned with a sealing ring for use in conduit joints used in such transmissions.

In the patent to Joseph A. Martin, No. 2,204,507, there is disclosed a sealing ring formed of semi-hard neoprene and adapted to be positioned in an annular recess surrounding a conduit at the juncture between two separable members. Rings of this character have been very successful in eliminating the many small drips and seepages previously encountered at conduit joints in hydraulic power transmission systems. Such rings have been found to hold a tight seal without the slightest drip or seepage under conditions where previously used constructions would leak badly. As a result of this, some users of these sealing rings have overworked their capabilities and have attempted to use them under such severe conditions as to materially shorten their useful life. For example, the matter of rigidity and resistance to warpage or other separation of the two main members of the conduit joint requires far less attention with such sealing rings than with prior constructions. They will hold their seal even though the crack between the two joint members should open up as much as fifteen or twenty thousandths of an inch under warping stresses. Some users, however, have attempted to apply the rings in joints where, due to improper design of the parts, the crack will open up to a greater distance and thus permit the material of the sealing ring to begin to flow through the crack when it is opened under high pressure forces.

For some purposes it is occasionally desirable to utilize a sealing ring of softer material than is usually used and which has a tendency to flow outwardly or extrude through the crack, even though the design of the joint parts be very heavy so that the crack does not open up very wide under warping stresses. With softer or more flowable materials of this nature it is therefore desirable to prevent any possibility of such extrusion into the crack.

It is an object of the present invention to provide an improved sealing ring in which the possibility of flow of the neoprene or similar material through the crack is prevented even though the crack be opened to a distance many times that which would permit flow with the ring of the Martin patent.

It is a further object to provide an improved conduit joint wherein a sealing ring identical in form and construction to that in the aforesaid Martin patent may be utilized under conditions of extreme separation of the joint parts without permitting extrusion of the ring material through the crack between the parts.

It is also an object of the invention to provide an improved conduit joint wherein flow or extrusion of the sealing ring into the crack between the two joint halves is absolutely prevented, even through the sealing ring be made of the very soft or flowable material.

Further objects and advantages of the present invention will be apparent from the following description, reference being had to the accompanying drawing wherein a preferred form of the present invention is clearly shown.

Figure 1:
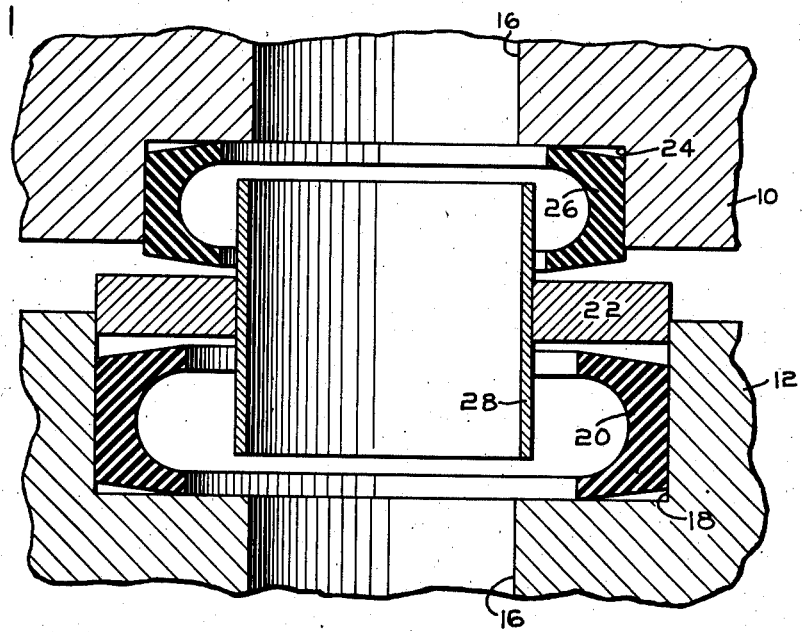
Figure 1 is a cross sectional view of a conduit joint embodying a preferred form of the present invention and showing the parts before they are finally drawn together.

Referring now to the drawing, two parts 10 and 12 of a complete conduit joint, for example, such as that illustrated in the Martin patent, are provided with portions of a conduit 16 which is to be joined.

Formed in the member 12 is a recess 18 which surrounds the conduit portion 16. A sealing ring 20, which may be identical to that disclosed in the Martin patent, is mounted in the recess 18, but the latter is of sufficient axial depth so that the ring 20 will not completely fill the same. The remaining space in the recess 18 is occupied by a metal ring 22 which is formed to slidably fit in the recess 18 with a clearance small enough so that the material of ring 20 will not extrude therethrough.

The member 10 is provided with a similar recess 24 carrying a similar sealing ring 26. The recess 24 is of smaller diameter than the recess 18 and of such depth that the ring 26 completely fills its axial length. Preferably, but not necessarily, a liner tube 28 may be mounted with a press fit in the interior bore of the ring 22 and is of a length slightly shorter than the axial depth of the two recesses 18 and 24 combined.

It will be understood that the rings 20 and 26 may be molded from neoprene or other synthetic or natural material having the resilient characteristics of rubber and preferably with a durometer hardness in the range of 65 to 85. This range is not critical, however, and softer or harder materials may also be used. If a softer material is used, the clearance between the ring 22 and recesss 18 must be held to a minimum, and a more highly finished surface where these parts are in contact is necessary.

Figure 2:
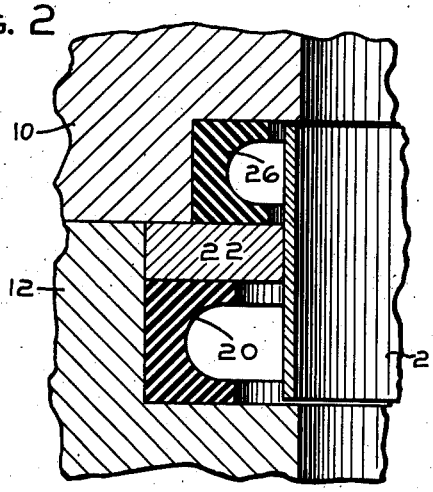
Figure 2 is a view corresponding to the left half of Figure 1 showing the parts after they have been drawn together.

When the parts have been assembled into the position shown in Figure 1, the bolts or other suitable fastenings by which the members 10 and 12 are secured together may be drawn up tightly causing the parts to occupy the position illustrated in Figure 2. This deflects the divergent lips of the sealing rings toward one another and creates an initial pressure urging the lips into contact with the adjacent metal surfaces to insure that a seal is initially established at the innermost corner of each lip independently of the application of fluid pressure.

Figure 3:
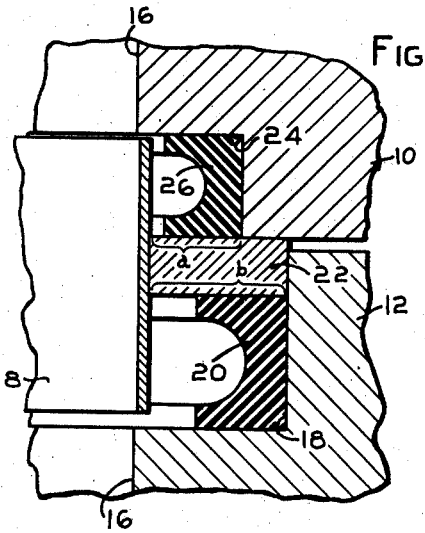
Figure 3 is a view corresponding to the right half of Figure 1 showing the parts in position under the application of fluid pressure.

When high pressures are applied, and if the fastening means and the design of the joint as a whole are such as to permit substantial opening of the crack between the two members, the parts take up the position such as illustrated in Figure 3. From this it will be seen that the ring 22 has moved upwardly with the member 10 to form a barrier against extrusion of the neoprene from either of the rings 20 or 26 through the crack.

In this connection it should be noted that, due to the difference in diameter between the recesses 18 and 24, the ring 22 must follow the member 10. When high fluid pressure is applied in the conduit 16, this pressure is transmitted practically equally to the surrounding walls of the recesses 18 and 24, and, since the neoprene, when completely confined in all directions, acts much like a body of fluid in that it transmits applied pressure throughout the body equally in all directions, it will be seen that the top surface of ring 22 is subjected to the equivalent of fluid pressure force over an annular area indicated by the bracket $a$ in Figure 3. The bottom surface of ring 22, however, is subject to fluid pressure or equivalent force over its full area as indicated by the bracket $b$. Therefore, if the ring is to be maintained in equilibrium, it must abut the bottom flat surface of member 10 with sufficient force to make up the difference between the force applied over area $a$ and that applied in the opposite direction over area $b$. For this reason the ring 22 can never leave contact with the member 10 so long as the ring remains in the recess 18. Accordingly, no crack can ever exist between member 10 and ring 22, and the ring 26 is thereby prevented from extruding. The ring 20 is prevented from extruding by reason of the fact that the annular clearance space between ring 22 and the cylindrical wall of recess 18 does not increase under pressure, but such variance as does occur is a decrease of this clearance due to radial expansion of ring 22.

While the form of embodiment of the invention as herein disclosed constitutes a preferred form, it is to be understood that other forms might be adopted, all coming within the scope of the claim which follows:

What is claimed is as follows:

A conduit joint comprising two members carrying portions of a conduit to be joined in register, said members having flat surfaces adapted to be secured in abutment, annular recesses, one in each member surrounding the conduit and one of larger diameter than the other, a pressure-operated flexible sealing ring in each recess, and a rigid ring between the sealing rings and in contact with the cylindrical outer wall of the large diameter recess, said rigid ring being exposed to pressure over a greater area in the larger recess than in the smaller recess and consequently remaining in contact with the member having the smaller recess when the members separate whereby extrusion of the sealing rings is inhibited even when the members are relatively widely separated.

WILLIAM G. FINLAYSON.
L. RAYMOND TWYMAN.
RALPH L. TWEEDALE.